United States Patent [19]

Basili

[11] 4,428,481
[45] Jan. 31, 1984

[54] UNIVERSAL STORAGE CONTAINER FOR VIDEO CASSETTES

[75] Inventor: Robert A. Basili, Waldwick, N.J.

[73] Assignee: Plastic Reel Corporation of America, Elmwood Park, N.J.

[21] Appl. No.: 462,981

[22] Filed: Feb. 1, 1983

[51] Int. Cl.$^3$ .............................................. B65D 85/67
[52] U.S. Cl. ................................... 206/387; 206/493; 220/339; 242/199
[58] Field of Search ................ 206/387, 493; 220/339; 242/199

[56] References Cited

U.S. PATENT DOCUMENTS 4,184,594 1/1980 Hehn .................................... 206/387
4,291,801 9/1981 Basili et al. ........................... 206/387

Primary Examiner—William T. Dixson, Jr.
Attorney, Agent, or Firm—Anthony J. Casella; Gerald E. Hespos

[57] ABSTRACT

A universal storage container for video cassettes is provided. The container includes substantially rectangular top and bottom walls which are hingedly connected to opposed edges of a rectangular rear wall. Front and opposed side walls extend from the top wall so as to define a substantially U-shaped enclosure. Rotation of the top wall about the rear wall and rotation of the rear wall about the bottom wall forms a hollow enclosure for the cassette. A pair of mounting posts are disposed on the bottom wall and are positioned such that they may be accepted into the central mounting holes of the Beta cassette when the reels of the Beta cassette are biased away from one another. Similarly, the mounting posts may be accepted into the central mounting holes of the VHS cassette when the reels of the VHS cassette are biased toward one another.

13 Claims, 5 Drawing Figures

UNIVERSAL STORAGE CONTAINER FOR VIDEO CASSETTES

BACKGROUND OF THE INVENTION

Video cassettes used with video cassette recorders are substantially rectangular box-shaped structures having a tape wound onto two reels that are rotationally mounted within an outer cover of the cassette. Each reel has a central sprocket receiving opening which engages a driving member on the video cassette recorder. The outer cover of the cassette has circular access apertures which are aligned respectively with the central sprocket receiving openings in each reel. To facilitate mounting of the cassette in the video cassette recorder, each reel is movable within the outer cover, but is biased to a position adjacent and centrally aligned with its circular access aperture in the outer cover of the cassette.

It is desirable to protect the cassette prior to purchase and during periods of storage between successive uses. More particularly, it is desirable to provide a container which will protect all sides of the cassette from damage that otherwise could occur if, for example, the cassette is dropped or mishandled during shipping or storage. Protection of the cassette is particularly important because damaged cassette structures cannot be replaced or repaired easily, and because a damaged cassette can damage the recorder in which it is placed. It is also desirable to securely enclose the cassette to prevent the accumulation of dust and other foreign matter on the tape and on the reels. Such foreign matter often has a detrimental affect on both the cassette and the recorder.

Video cassettes are manufactured and sold in both the VHS size and the more compact Beta size. The VHS cassettes are approximately 20% larger than the Beta cassettes. Most prior art storage containers for video cassettes are manufactured in two distinct sizes which correspond respectively to the sizes of the VHS and Beta cassettes. Many of the storage containers include a rectangular bottom wall, at least three upstanding side walls and a hingedly attached rectangular top wall. Other prior art cassette storage containers include separate base and cover members. The base members of these prior art containers is a substantially box-shaped structure into which the cassette is slidably inserted. The cover member is dimensioned to be telescopingly slid over the base member.

U.S. Pat. No. 4,184,594 which issued to Bruce A. Hehn on Jan. 22, 1980, is directed to a storage container which is intended to accept both the VHS and the Beta cassettes. The storage container of U.S. Pat. No. 4,184,594 is a hinged top container, the bottom wall of which includes first and second projection members. The first projection member of U.S. Pat. No. 4,184,594 is defined by a pair of concentric inner and outer annular rings which extend upwardly from the bottom wall, while the second projection member is defined by two arc sections which are joined into a generally oval configuration. In use, the circular openings in the outer cover of the cassette are engaged respectively by the outer annular ring of the first projection member and by one arc section of the second projection member. More particularly, when a Beta cassette is in the container of U.S. Pat. No. 4,184,594, the arc section of the second projection member most distant from the first projection member is intended to engage part of one circular access aperture in the outer cover of the Beta cassette. Conversely, when a VHS cassette is stored in the container of U.S. Pat. No. 4,184,594, the arc section of the second projection member nearest the first projection member is intended to engage part of one circular access aperture in the outer cover of the VHS cassette. In this manner, the first and second projection members of the container of U.S. Pat. No. 4,184,594 are intended to accept and retain either the Beta or VHS size video cassettes.

The container to which U.S. Pat. No. 4,184,594 is directed has several deficiencies. Specifically, the outer annular ring of the first projection member and the entire second projection member are intended to engage only the outer cover of the cassette structure, and not the reels therein. Consequently, the outer annular ring and the second projection member of U.S. Pat. No. 4,184,594 both are of a height approximately equal to the thickness of the plastic material from which the outer cover is constructed. As a result of this relatively low height of the projection members of the container to which U.S. Pat. No. 4,184,594 is directed, the cassette can easily become disengaged by minor movements of the container made by the user as the user is closing the container. Attempts to close the container of U.S. Pat. No. 4,184,594 while the cassette is improperly positioned, can cause damage to either the cassette or the container.

The ability of the container of U.S. Pat. No. 4,184,594 to properly retain either the VHS or Beta cassettes is dependent upon the precise dimensions of and spacing between the access apertures in the outer cover the cassette. It has been found, however, that the dimensions and spacings between the access apertures are subject to significant variations particularly from one manufacturer of cassettes to the next. Even minor variations of the dimensions or spacing between the access apertures of the cassette substantially affect the ability of the container of U.S. Pat. No. 4,184,594 to properly retain the cassette. Specifically, in many instances the cassette either will not mount on the projection members or must be forced onto the projection members thereby creating the possibility of damage to the cassette. In other instances, the spacing between the access apertures will result in an extremely loose mounting of the cassette on the projection members. A cassette that is loosely mounted on the low projection members of the container to which U.S. Pat. No. 4,184,594 is directed easily can become disengaged from the projection members as the container is being closed, thus creating the possibility of damage to the cassette as noted above. To overcome these inherent deficiencies of the low height of the projection members, U.S. Pat. No. 4,184,594 also shows embodiments wherein posts of greater height are incorporated into the second projection member. Each post is positioned to be inserted into a sprocket on the reel on the cassette. These posts make proper positioning of the cassette in the container of U.S. Pat. No. 4,184,594 extremely cumbersome, and increase the probability of damage to either the container or the cassette.

Proper positioning of a cassette in the container shown in U.S. Pat. No. 4,184,594 is made even more difficult by the fact that the projection members are disposed on the wall that includes the opposed end walls and the front wall of the container. More particularly, the end walls and front walls of the container in U.S. Pat. No. 4,184,594 block both light and vision thereby making it difficult for the user to properly position the cassette.

U.S. Pat. No. 4,291,801 which issued to Robert A. Basili and William B. Wilson on Sept. 29, 1981, and which is assigned to the assignee of the subject application, is directed to a "video cassette storage container" which overcomes several of the deficiencies of the container described in U.S. Pat. No. 4,184,594. More particularly, the video cassette storage container to which U.S. Pat. No. 4,291,801 is directed includes a substantially rectangular bottom wall having opposed front and rear edges and opposed side edges. A substantially rectangular rear wall is hingedly connected to the rear edge of the bottom wall of the container of U.S. Pat. No. 4,291,801, and a substantially rectangular top wall having opposed front and rear edges and opposed side edges is hingedly connected to the rear wall along the edge thereof. Substantially rectangular upstanding front and side walls extend from the top wall adjacent the front and side edges thereof. Thus, when the top and bottom walls are rotated about their respectively hinged connections toward one another and into parallel alignment with one another, the front, rear and opposed side walls and the opposed top and bottom walls define a substantially hollow enclosed container.

The container of U.S. Pat. No. 4,291,801 further includes a means for positively engaging one access aperture of a video cassette. The engaging means is defined by a plurality of sectors which are arranged in a generally circular array. The sectors are configured to positively engage one aperture of either a VHS or Beta cassette. This positive engagement is attributable to both the configuration of individual sectors and the particular arrangement of the array. Thus, the video cassette can be easily but securely mounted on the circular array of sectors and positively and securely held in position.

Despite the many advantages of the container of U.S. Pat. No. 4,291,801, it has been found desirable to develop a container which enables the cassette to be more securely mounted therein.

Accordingly, it is an object of the subject invention to provide a storage container that can readily accept either the VHS or Beta size video cassettes.

It is another object of the subject invention to provide a storage container that will enable either a VHS or Beta cassette to be easily and properly positioned within the container.

It is a further object of the subject invention to provide a storage container for either VHS or Beta cassettes that will substantially eliminate movement of the cassette within the container.

It is yet another object of the subject invention to provide a storage container for VHS and Beta cassettes that will adequately protect the cassette from damage during shipping and storage.

It is still a further object of the subject invention to provide a storage container for VHS and Beta cassettes that will keep foreign matter away from the cassette during shipping and storage.

It is an additional object of the subject invention to provide a storage container that can accommodate VHS and Beta size video cassettes, despite variations in the dimensions and spacings of the access apertures in the outer cover of the cassette.

SUMMARY OF THE INVENTION

The subject universal storage container for video cassettes defines a generally rectangular hollow enclosure which includes generally rectangular top and bottom walls disposed in spaced parallel relationship. Substantially rectangular front, rear and opposed side walls extend between the top and bottom walls. The front and opposed side walls are rigidly connected to the top wall, but are not connected to the bottom wall. The rear wall, however, is hingedly connected to both the top and bottom walls. Thus, the top, rear and bottom walls may be rotated with respect to one another to open the subject universal storage container.

A pair of upstanding substantially cylindrical mounting posts extend from the surface of the bottom wall on the inside of the container. The mounting posts are dimensioned and positioned to be readily accepted into the central mounting apertures of the reels on either the VHS or Beta cassettes. More particularly, although the reels of each cassette are biased to a central alignment with respect to the apertures in the outer cover of the cassette, each reel is movable both toward or away from the other reel.

The positioning of the mounting posts takes advantage of this movement of the reels. Specifically, the mounting posts are dimensioned and located to be acceptable in the central apertures of the Beta cassette reels when the reels are moved away from one another. The mounting posts also are dimensioned and located to be acceptable in the central apertures of the VHS cassette reels when the reels are moved toward one another.

The mounting posts each are of a smaller diameter than the central apertures in the reels of either the VHS or Beta cassettes. Therefore the mounting posts are easily accepted into these central apertures in the reels. Additionally, the biasing forces that must be overcome to move the reels of the Beta cassette away from one another or to move the reels or the VHS cassette toward one another tend to keep the reels properly positioned on their respective mounting posts. However, this biasing force is not so great as to make proper positioning and mounting of the cassette in the subject container difficult. It is also important to note that since the mounting posts of the subject container extend entirely into and are engaged by the central apertures of the reels in both the Beta and VHS cassettes, the cassettes are more securely mounted than in the prior art containers described above.

The dimensions defined by the front, rear and opposed side walls closely conform to the dimensions of the VHS cassette. Consequently, the VHS cassette is prohibited from moving within the subject container by both the outer walls of the container and by the positioning of the mounting posts within the central apertures of the reels of the cassette. As noted above, however, the Beta cassette is significantly smaller than the VHS cassette. To further prohibit movement of the Beta cassette within the subject container, the mounting posts are located a distance from the rear wall that ensures that the edge of the cassette along which the tape is exposed will abut the rear wall of the container. Consequently, the positioning of the mounting posts in the central apertures on the reels on the Beta cassette and the positioning of the Beta cassette against the rear wall of the container substantially eliminates any possible movement of the Beta cassette within the subject container.

DETAILED DESCRIPTION OF THE PREFERRED EMBODIMENT

Figure 1:
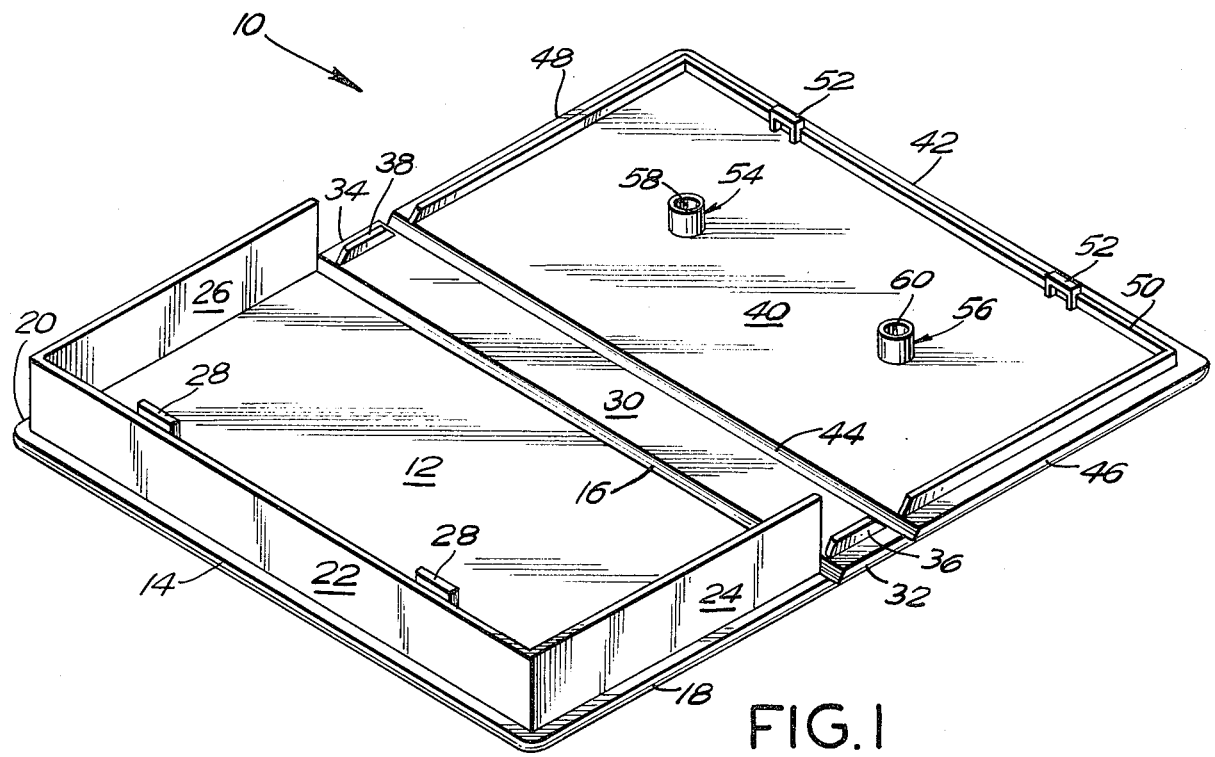
FIG. 1 is a perspective view of the container of the subject invention.

The universal storage container for video cassettes, as shown in FIG. 1, is indicated generally by the numeral 10. More particularly, the universal storage container 10 is shown in its fully opened position in FIG. 1, but as explained further herein, the universal storage container 10 is adapted to be closed to form a generally hollow enclosure for storing and shipping video cassettes. Preferably, the universal storage container 10 is formed from a unitary piece of molded plastic material such as polypropylene.

The universal storage container 10 includes a substantially rectangular top wall 12 having opposed front and rear edges 14 and 16 and opposed end edges 18 and 20. A substantially rectangular upstanding front wall 22 and opposed side walls 24 and 26 extend from the top wall 12 such that the front and side walls 22, 24 and 26 are slightly spaced from and substantially parallel to front and opposed side edges 14, 18 and 20 respectively of the top wall 12. More particularly, the opposed side walls 24 and 26 extend perpendicularly from the front wall 22 such that a generally U-shaped enclosure is defined around three peripheral edges 14, 18 and 20 of top wall 12. Locking tabs 28 are disposed on the edge of front wall 22 opposite the top wall 12. The locking tabs 28 enable the subject universal storage container 10 to be securely maintained in a closed position, as explained further below.

A substantially rectangular rear wall 30 is hingedly connected to the top wall 12 along rear edge 16 thereof. Rear wall 30 is partially defined by opposed edges 32 and 34, which when the subject universal storage container 10 is in the open position, shown in FIG. 1, are colinear with side edges 18 and 20 respectively of the top wall 12. Closure flanges 36 and 38 are mounted on the rear wall 30 parallel to and slightly spaced from the edges 32 and 34 thereof respectively. More particularly, closure flange 36 is separated from edge 32 of rear wall 30 by an amount equal to the spacing of side wall 24 from side edge 18 plus the thickness of side wall 24. Similarly, closure flange 38 is spaced from edge 34 by an amount equal to the spacing of side wall 26 from edge 20 plus the thickness of side wall 26. Thus, when the top and rear walls 12 and 30 are rotated into a perpendicular alignment with respect to one another the closure flanges 36 and 38 will be adjacent side walls 24 and 26 and on the inside of the container. Therefore foreign material, such as dust, is virtually precluded from entering the container 10.

Substantially rectangular bottom wall 40 is defined by opposed front and rear edges 42 and 44 and opposed side edges 46 and 48. The bottom wall 40 is foldably connected to the rear wall 30 along the rear edge 44. Peripheral closure flange 50 extends continuously around a portion of the bottom wall 40 perimeter defined by front edge 42 and side edges 46 and 48. The peripheral closure flange 50 is spaced from the respective front and side edges 42, 46 and 48 by a distance that enables the peripheral closure flange 50 to be adjacent front and side walls 22, 24 and 26 when the subject universal storage container 10 is closed. Thus, the peripheral closure flange 50 further precludes the possibility of foreign matter entering into the subject container 10. Tab receiving members 52 are disposed on the peripheral flange 50 such that when the universal storage container 10 is rotated into its closed position tabs 28 will engage tab receiving member 52 and securely maintain the storage container in its closed position.

Mounting posts 54 and 56 define substantially cylindrical members which extend from bottom wall 40. Mounting posts 54 and 56 each are of approximately 3/16 inch radius, as indicated by dimension "D" in FIGS. 2 and 3, and approximately ⅝ inch in height. The distance from the central axis of each mounting post 54 or 56 to the rear wall 30 of the container 10 is approximately 2¼ inches. Additionally, the center-to-center distance between mounting posts 54 and 56 is approximately equal to 3 5/16 inches as indicated by dimension "C". It follows that the distance "B" between the innermost extremities of mounting posts 54 and 56 is approximately equal to 2 5/16 inches (e.g. 3 5/16 −3/16−3/16=2 15/16, and that the distance "A" between the outermost extremities on mounting posts 54 and 56 is approximately 3/11/16 inches (e.g. 3 5/16+3/16+3/16=3 11/16. Returning to FIG. 1, mounting posts 54 and 56 include center wells 58 and 60. Center walls 58 and 60 serve to reduce the material needed to form container 10 and also reduce the heat retention of mounted posts 54 and 56 during the formation of container 10.

Figure 4:
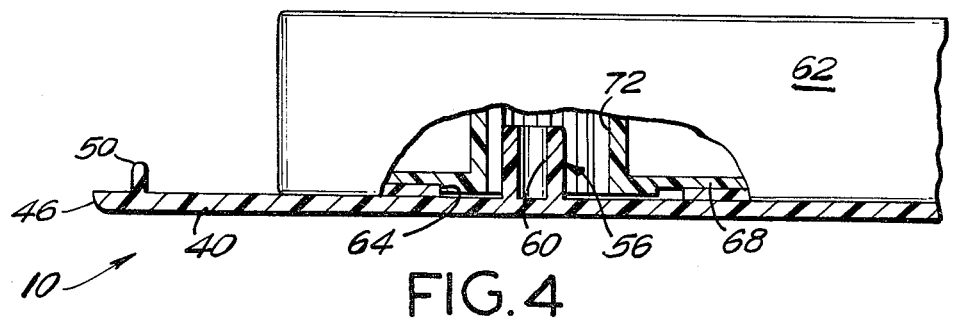
FIG. 4 is a cross sectional view, taken along line 4—4 in FIG. 2.
Figure 2:
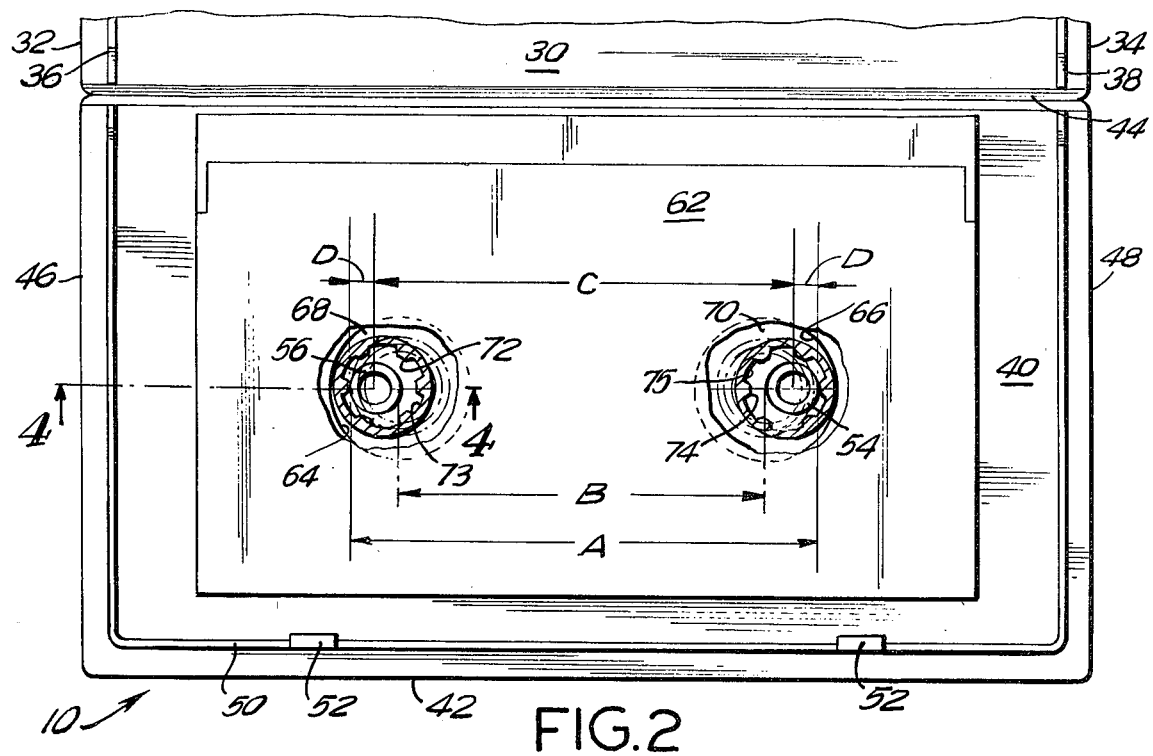
FIG. 2 is an elevational view, partly in section, of a Beta size cassette mounted in the subject container.

FIGS. 2 and 4 show a Beta sized video cassette 62 mounted in the universal storage container 10. The cassette 62 includes access apertures 64 and 66 located on the side of cassette 62 mounted adjacent bottom wall 40. The access apertures 64 and 66 provide access to the reels 68 and 70. Reels 68 and 70 each include center mounting holes 72 and 74 respectively, which are configured to accept the driving sprockets on the video cassette recorder with which cassette 62 is used. More particularly, outwardly extending notches 73 and 75 are disposed around the periphery of mounting holes 72 and 74 to engage driving sprockets on the recorder. The reels 68 and 70 are movably mounted within the cassette 62 to facilitate the mounting of the cassette 62 in the video cassette recorder. More particularly, reels 68 and 70 can be moved within the cassette 62 such that the center mounting hole can approach internal tangency with the respective access apertures 64 and 66 at any location on access apertures 64 and 66. However, reels 68 and 70 are biased to return to a position centrally located with respect to access apertures 64 and 66.

As shown in FIG. 2, the reels 68 and 70 are biased away from one another. When the biasing forces on reels 68 and 70 are released, the reels 68 and 70 will return to a position indicated by the phantom lines wherein the distance between the reels is less.

The mounting posts 54 and 56 are disposed on bottom wall 40 such that cassette 62 can be mounted on mounting posts 54 and 56 by urging reels 68 and 70 away from one another. More particularly, the approximately 3

11/16 inch distance "A" between outermost extremities of mounting posts 54 and 56 is substantially equal to the distance between the outermost extremities of reels 68 and 70 when reels 68 and 70 are biased away from each other, as shown in FIG. 2. When mounted in this manner the biasing tendency of reels 68 and 70 to return to their central position will urge the center mounting holes 72 and 74 against the mounting posts 56 and 54 respectively. Consequently, this cooperation between the center mounting holes 72 and 74 and the mounting posts 56 and 54 respectively will more securely retain the cassette 62 in the subject universal storage container 10.

Figure 5:
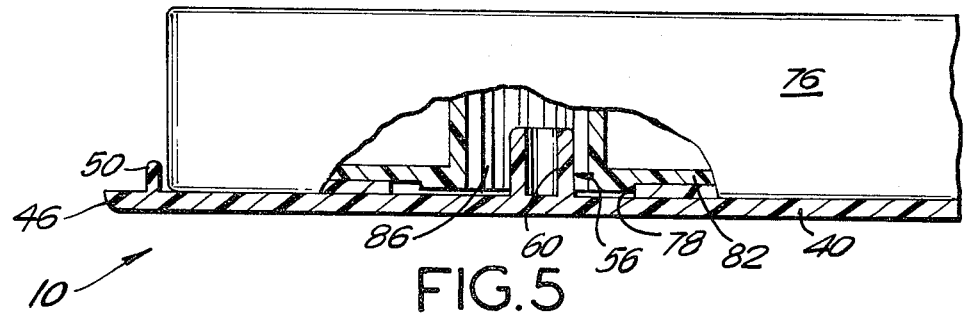
FIG. 5 is a cross sectional view, taken along line 5—5 in FIG. 3.
Figure 3:
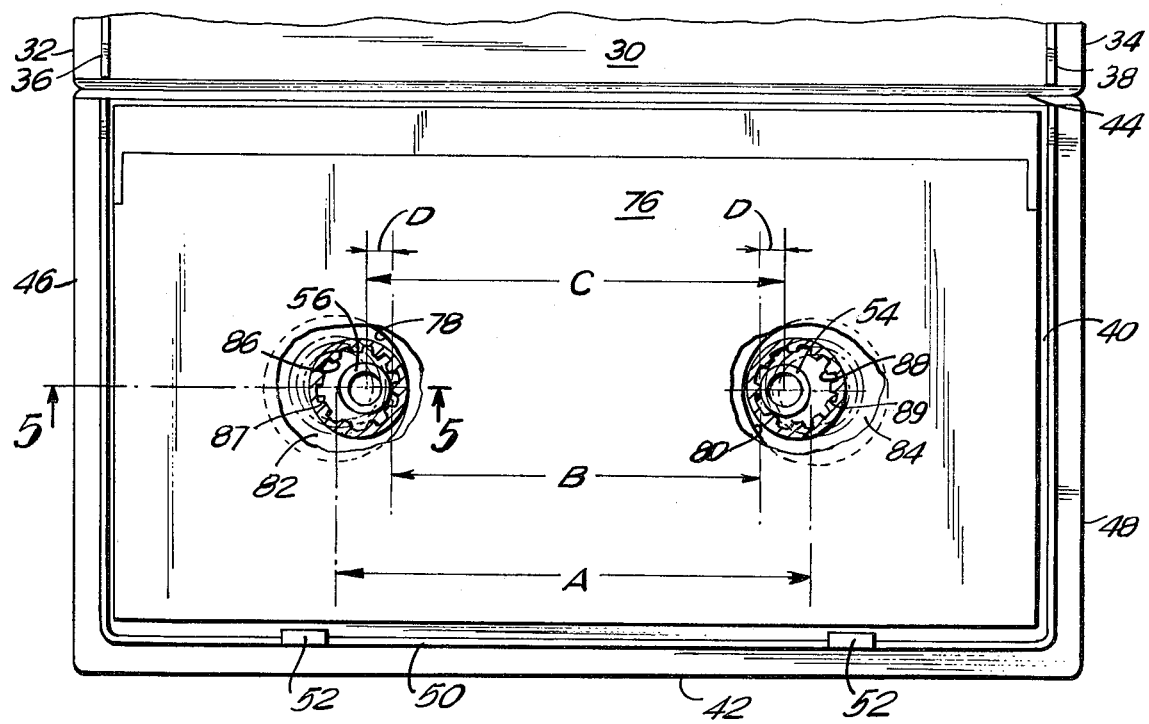
FIG. 3 is an elevational view, partly in section, of a VHS size cassette mounted in the subject container.

FIGS. 3 and 5 show a VHS size video cassette 76 mounted in the universal storage container 10. The VHS cassette 76 includes access apertures 78 and 80 which provide access to reels 82 and 84. Reels 82 and 84 include central mounting holes 86 and 88, and outwardly extending notches 87 and 89 are disposed about the periphery of mounting holes 86 and 88 to engage the driving sprockets on the video cassette recorder with which the VHS cassette 76 is used.

As explained with reference to the Beta cassette 62, the reels 82 and 84 are movably mounted within the VHS cassette 76 such that the central mounting holes 86 and 88 may be moved toward positions of approximate internal tangency at any location on the access apertures 78 and 80 respectively. However, the reels 82 and 84 are biased to return to the substantially central position with respect to access apertures 78 and 80.

When the cassette 76 is mounted in the universal storage container 10, as shown in FIG. 3, the reels 82 and 84 are biased toward one another so that the distance between their innermost extremities is substantially equal to the approximately 2 15/16 inch distance "B" between the innermost extremities of mounting posts 54 and 56. In this manner, the mounting posts 56 and 54 are internally tangent with the central mounting holes 86 and 88 of reels 82 and 84. Additionally, the biasing forces of reels 82 and 84 are urging the reels 82 and 84 away from one another and against the mounting posts 56 and 54 respectively. This biasing force of reels 82 and 84 against mounting posts 56 and 54 assures a secure mounting of cassette 76 in the universal storage container 10.

The mounting of either the Beta cassette 62 or the VHS cassette 76 in the storage container 10 can be accomplished quite easily. Specifically, to mount the Beta cassette 62, as shown in FIG. 2, the Beta cassette 62 is disposed at an angle to bottom wall 40 such that the central mounting hole 72 is placed on the mounting post 56 and such that central mounting hole 74 is spaced from mounting post 54. The cassette 62 then is slidably moved toward mounting post 54 causing reel 68 to move away from reel 70. The Beta cassette 62 then is rotated toward bottom wall 40 allowing the central mounting hole 74 to advance over the mounting post 54. In this disposition, the reels 68 and 70 both will be biased away from one another thereby securely retaining the cassette 62 on posts 54 and 56.

The same principles are utilized to mount the VHS cassette 76 on mounting posts 54 and 56. Specifically, the VHS cassette 76 is advanced toward the bottom wall 40 at an angle so that the central mounting hole 86 engages the mounting post 56. In this instance the VHS cassette 76 is moved such that the access aperture 78 proceeds away from the mounting post 54. After movement of cassette 76 its maximum amount in this direction, cassette 76 is rotated to enable the mounting post 54 to enter central mounting hole 88. In this final position, the reels 82 and 84 both will be raised toward one another, as shown in FIG. 3. This biasing force keeps VHS cassette 76 securely mounted on mounting posts 54 and 56.

In summary, a universal video cassette storage container is provided which securely and easily accepts video cassettes of either the Beta or VHS type. The container includes top and bottom walls which are foldably connected to opposed sides of a rectangular rear wall. The top wall includes a front and opposed side walls which define a substantially U-shaped enclosure upstanding from the top wall. When the top and bottom walls are rotated into their closed position, the top, bottom, front, rear and opposed side walls define a hollow enclosure. A pair of mounting posts extend from the bottom wall. The mounting posts are positioned so that they can be accepted into the central mounting holes of a Beta cassette when the reels of the Beta cassette are biased away from one another. Similarly, the mounting posts can be accepted into the central mounting holes of a VHS cassette when the reels of the VHS cassette are biased toward one another. The mounting posts extend from the bottom wall a sufficient distance through the access apertures in the cassettes to enable secure engagement with the central mounting holes of the reels. Thus, the biasing forces of the reels against the mounting posts ensure that either the Beta or VHS cassettes will be properly and securely retained on the mounting posts.

What is claimed is:

1. A universal storage container for securely retaining either a first or second size video cassette, each of which includes an outer cover and a pair of reels mounted therein, the reels of the first size video cassette being spaced further apart than the reels of the second size video cassette, each said reel including a central mounting hole and said outer cover including a pair of apertures providing access to the mounting holes in said reels, the access apertures being larger than their respective mounting holes, said reels in each cassette being movable a limited distance toward and away from each other but being biased to return to a central alignment with respect to the respective access apertures, such that when the reels of the first size video cassette are moved closest to each other, the distance between the innermost extremities of the mounting holes therein defines a first distance, and such that when the reels of the second size video cassette are moved farthest from each other, the distance between the outermost extremities of the mounting holes defines a second distance, said second distance being greater than said first distance, said container comprising:

a generally rectangular enclosure having opposed top and bottom walls, opposed front and rear walls, and opposed side walls, said top and bottom walls being hingedly connected to said rear wall; and a pair of mounting posts disposed on and projecting from said bottom wall for engagement with the central mounting holes of the reels in said first and second size cassettes, said mounting posts being dimensioned and spaced from one another such that the distance between the innermost extremities of said mounting posts is not less than said first distance, and such that the distance between the outermost extremities of said mounting posts is not greater than said second distance, whereby when said reels of said first size cassette are biased toward each other, said first size cassette may be placed in said container with the mounting posts thereof extending into the respective mounting holes with the biasing force of said reels of said first size cassette away from each other retaining said first size cassette in said container, and whereby when said reels of said second size cassette are moved away from each other said second size cassette may be placed in said container with the mounting posts thereof extending into the respective mounting holes in said second size cassette with the biasing force of said reels of said second size cassette toward each other retaining said second size cassette in said container.

2. A container as in claim 1 wherein said container is formed of molded plastic material.

3. A container as in claim 2 wherein said container is of unitary construction.

4. A container as in claim 1 wherein said front and opposed side walls extend perpendicularly from and integral with said top wall.

5. A container as in claim 1 wherein the mounting posts are of cylindrical configuration, and wherein the axis of each said cylindrical mounting post is substantially perpendicular to said bottom wall.

6. A container as in claim 5 wherein the axial length of each said mounting post is approximately ⅜ inch.

7. A container as in claim 5 wherein the distance between the innermost extremities of said mounting post is approximately 2 15/16 inches and wherein the distance between the outermost extremities of said mounting post is approximately 3 11/16 inches.

8. A container as in claim 5 wherein each said mounting post is of tubular configuration with an axially aligned cylindrical well disposed therein.

9. A container as in claim 1 wherein the longitudinal axis of each said mounting post is approximately 2¼ inches from said rear wall.

10. A container as in claim 4 wherein said bottom wall includes a peripheral flange disposed adjacent said top and opposed side walls, said peripheral flange preventing the entry of foreign material into said container.

11. A container as in claim 1 further including locking means to securely retain said container in its closed condition.

12. A universal storage container formed from a unitary molded plastic material for securely retaining either a first or second size video cassette each of which includes an outer cover and a pair of reels mounted therein, the reels of the first size video cassette being spaced further apart than the reels of the second size video cassette, each said reel including a generally circular central mounting hole having a plurality of sprocket receiving notches disposed about and extending outwardly from the peripheral of said mounting hole, said outer cover including a pair of apertures providing access to the mounting holes of the reels, the access apertures being larger than the area defined by the respective mounting holes and notches, said reels of each said cassette being movable a limited distance toward and away from each other but being biased to return to a central alignment with respect to the respective access apertures, such that when the reels of the first size video cassette are moved closest to each other the distance between the innermost extremities of the mounting holes therein defines a first distance and such that when the reels of the second size video cassette are moved farthest from each other, the distance between the outermost extremities of the mounting holes defines a second distance, said second distance being greater than said first distance, said container comprising:

a generally rectangular enclosure having opposed top and bottom walls, opposed front and rear walls, and opposed side walls, said top and bottom walls being hingedly connected to said rear wall, and said front and opposed side walls extending perpendicularly from and unitary with said top wall; and a pair of cylindrical mounting posts disposed on and projecting perpendicularly from said bottom wall for engagement with the central mounting holes of the reels in said first and second size cassettes, the distance between the innermost extremities of said mounting posts being not less than said first distance and the distance between the outermost extremities of said mounting posts being not greater than said second distance, whereby when said reels of said first size cassette are biased toward each other, said first size cassette may be placed in said container with the mounting posts thereof extending into the respective mounting holes with the biasing force of said reels of said first size cassette away from each other retaining said first size cassette in said container, and whereby when said reels of said second size cassette are moved away from each other said second size cassette may be placed in said container with the mounting posts thereof extending onto the respective mounting holes in said second size cassette with the biasing force of said reels of said second size cassette toward each other retains said second size cassette in said container.

13. A container as in claim 12 wherein the longitudinal axis of each said mounting post is approximately 2¼ inches from said rear wall of said container.

* * * * *